United States Patent [19]

Frost et al.

[11] Patent Number: 5,062,028

[45] Date of Patent: Oct. 29, 1991

[54] SELF-CONTAINED SOLAR POWERED LAMP

[75] Inventors: John S. Frost; Lloyd V. Wallace, both of Thousand Oaks; Mark R. Erickson, Oxnard; Bethanne Felder, Thousand Oaks, all of Calif.

[73] Assignee: Atlantic Richfield Company, Los Angeles, Calif.

[21] Appl. No.: 392,694

[22] Filed: Aug. 11, 1989

[51] Int. Cl.5 .............................................. F21L 1/00
[52] U.S. Cl. .................................. 362/183; 362/152; 362/190; 362/202; 362/431
[58] Field of Search ............... 362/183, 186, 190, 191, 362/202, 431, 153, 153.1, 152

[56] References Cited

U.S. PATENT DOCUMENTS

| 3,805,055 | 4/1974 | Cassey | 362/431 |
|---|---|---|---|
| 3,833,804 | 9/1974 | Vessely | 362/431 |
| 4,027,150 | 5/1977 | Dean | 362/186 |
| 4,047,150 | 9/1977 | Kelley | 362/191 |
| 4,388,674 | 6/1983 | Sano | 362/186 |
| 4,428,034 | 1/1984 | Seller | 362/186 |
| 4,481,562 | 11/1984 | Hickson | 362/183 |
| 4,774,648 | 9/1988 | Kakuk et al. | 362/431 |
| 4,841,416 | 6/1989 | Doss | 362/183 |
| 4,843,525 | 6/1989 | Williams | 362/183 |
| 4,858,887 | 8/1989 | Carter | 362/431 |

Primary Examiner—Ira S. Lazarus
Assistant Examiner—Sue Hagarman
Attorney, Agent, or Firm—Nilsson, Robbins, Dalgarn, Berliner, Carson & Wurst

[57] ABSTRACT

A self-contained photovoltaic powered light which is a stand alone unit. The solar cells which power the light are assembled and maintained within the top, or upper, portion of the self-contained unit. The solar cells are encapsulated within a resiliently deformable material to provide for contraction and expansion of the solar cells while at the same time providing protection from the elements for the assembly. A component tray assembly is rotationally secured to the upper portion of the lamp and a lens with decorative disks are rotationally secured to the component tray assembly.

13 Claims, 4 Drawing Sheets

FIG. 2
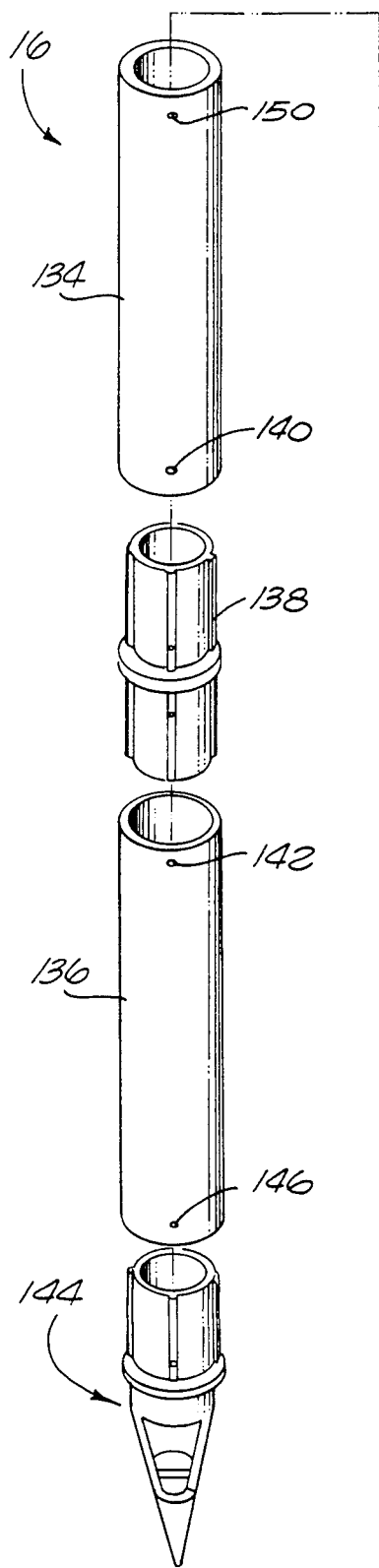
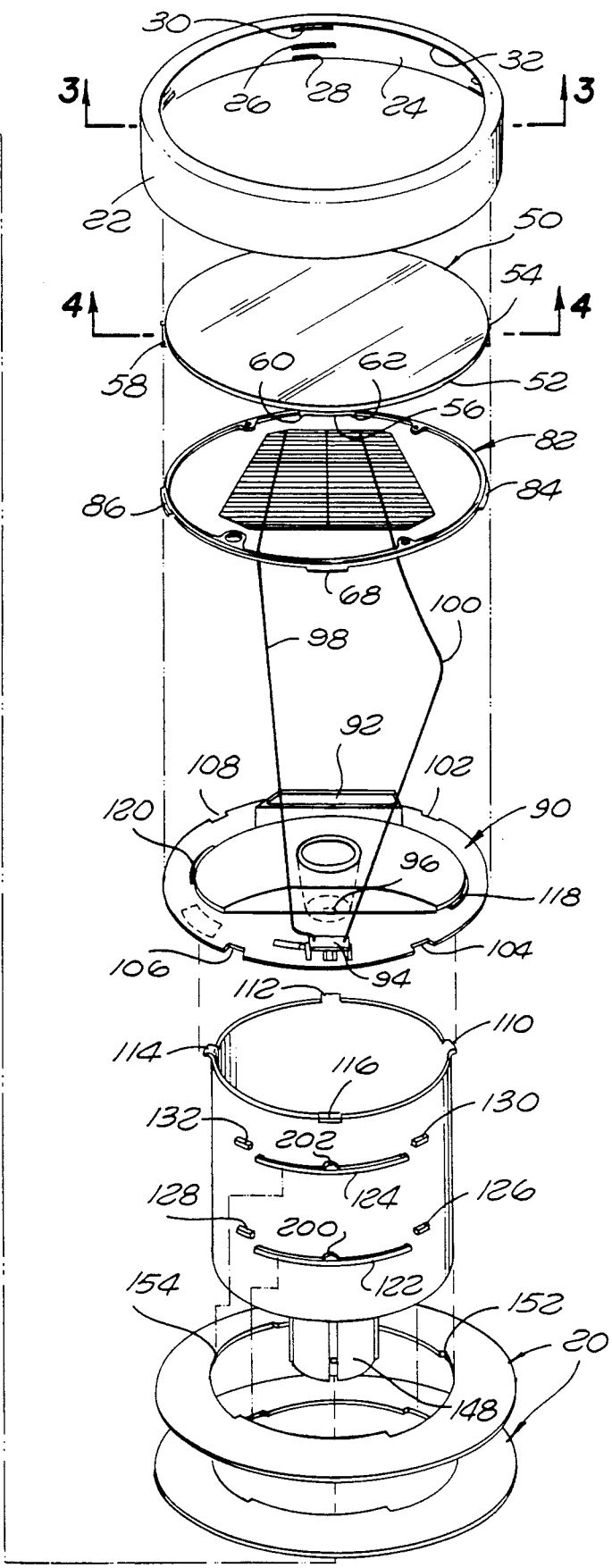

SELF-CONTAINED SOLAR POWERED LAMP

BACKGROUND OF THE INVENTION

This invention relates generally to lighting devices and more particularly to a self-contained photovoltaic powered lamp. More specifically, the invention is directed to a unique construction permitting easy assembly of the lamp.

In the prior art, there exists many electrically powered outdoor lighting systems which are utilized to illuminate pathways, yards, certain areas of parks, or other predetermined areas. Typically such lights are connected to the public utility system, or similar source of electrical power and are controlled by preset timing devices so that they illuminate at nightfall and extinguish at a predetermined time, such as approaching daybreak, or the like. Such lights require extensive cabling, including conduits as well as appropriate timing mechanisms and are thus relatively expensive to install and maintain. In addition thereto, by utilizing electric power generated in the traditional manners, such as by the burning of fossil fuels, additional contamination of the environment occurs as well as depletion of fossil fuel sources. Therefore, there is a need to provide a source of illumination for predetermined outdoor areas which does not require connection to a public utility source of power or the like and which is relatively easy and inexpensive to install and requires no maintenance.

SUMMARY OF THE INVENTION

A self-contained solar powered lamp is provided including an upper portion containing a solar cell assembly. A component tray is secured to the upper portion by alignment of latching blades and ribs and rotation thereof. A lens is secured in place upon the component tray assembly by proper alignment of latching fingers with openings provided in the component tray and rotation of the lens. Decorative disks are secured to the lens by appropriate alignment of openings and protruding sectors and rotation of the disks to secure the same between the sectors and stops provided on the exterior surface of the lens.

BRIEF DESCRIPTION OF THE DRAWINGS

FIG. 2 is an exploded view showing the various component parts of the structure as illustrated in FIG. 1;

FIG. 3 is a cross-sectional view of the bezel taken about the lines 3—3 of FIG. 2;

FIG. 4 is a cross-sectional view of the cover taken about the lines 4—4 of FIG. 2;

DETAILED DESCRIPTION

Figure 1:
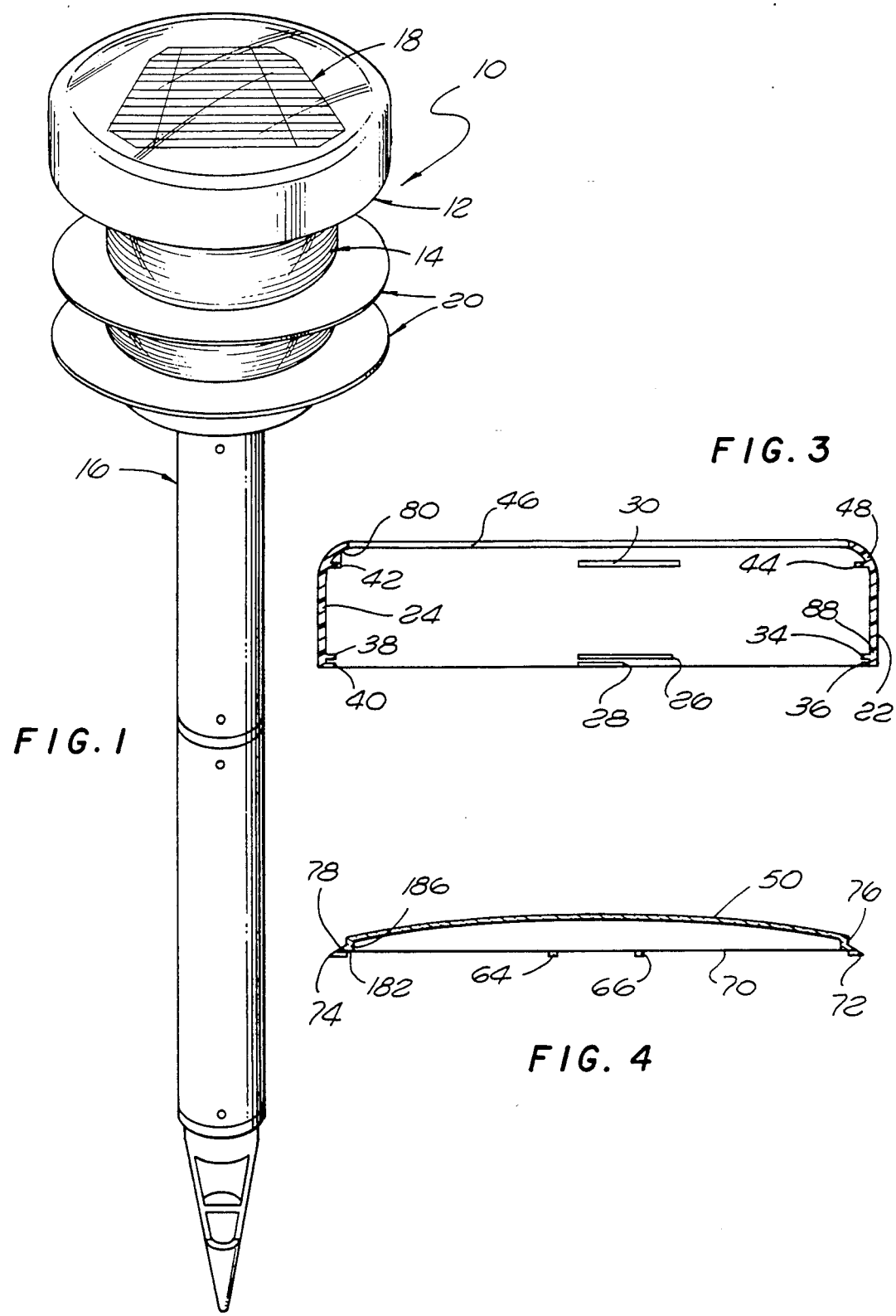
FIG. 1 is a perspective view illustrative of a light constructed in accordance with the principles of the present invention.

The self-contained lamp 10 is illustrated in FIG. 1 and is a stand alone lamp which includes a self-contained electrical power source such as a battery which is maintained in a charged condition by a solar cell array and includes an electrical circuit which controls application of electrical power to an electric light bulb contained therein. The electrical power from the battery is supplied to the light bulb when the solar cell array is not producing electricity, that is, when the ambient light falls below a predetermined level. The lamp 10 includes top portion 12 having a lens 14 affixed thereto. A stake 16 is, in turn, attached to the lens 14 and is used to position the lamp 10 in the desired area such, for example, as by inserting the stake 16 into the earth. A solar cell assembly 18 is retained within the top portion 12 while decorative disks 20 are retained upon the lens 14. The entire lamp assembly 10, as illustrated in FIG. 1, may be moved from place to place and positioned at any particular point which may be desired for any particular application. For example, a plurality of the lamps 10 may be positioned to illuminate a pathway as well as to delineate the same. In addition, such a plurality of lamps 10 may be placed to illuminate a given area during nighttime hours.

By reference to FIG. 2, a more detailed understanding of the structure of the lamp 10 may be obtained. The upper portion 12 of the lamp includes a bezel 22 which is preferably constructed of a molded plastic, such as ASA (acrylic styrene acrylonitrile) or the like, which is sturdy yet somewhat flexible for the purposes to be described below.

The bezel 22 having an upper part 48 and a lower part 88 defines an inner surface 24 from which there inwardly extends a plurality of spaced apart latching ribs as shown at 26 and 28. Similar ribs, such as those illustrated at 26 and 28, are angularly disposed about the inner surface 24 of the bezel 22. Preferably, the latching ribs are disposed at 90° intervals about the surface 24, however, they may be disposed at different angular positions such as 120° or 60° depending upon the number desired. Also inwardly directed from the surface 24 are a plurality of snap lock retainers as shown at 30. Again, such snap lock retainers are angularly disposed about the surface 24 and preferably at 90° intervals although other intervals may be utilized as desired.

The bezel 22 also defines an upper opening 32 within which the solar cell array is disposed to receive the sunlight during daylight hours to charge the battery contained within the light. The details of construction of the bezel 22 may be better understood by reference to FIG. 3 which more clearly shows the position and relationships of the latching ribs and the snap lock retainer. As is therein shown, additional latching ribs 34, 36, 38 and 40 are shown extending inwardly from the inner surface 24 of the bezel 22. Additional snap lock retainers 42 and 44 are also illustrated. As is more clearly shown in FIG. 3, the snap lock retainer 30 is displaced downwardly from the edge 46 of the bezel which defines the opening 32. As will be described more fully hereinafter, such spacing permits the solar cell assembly 18 to be snapped into place within the bezel 22 and securely held there.

By reference, again, to FIG. 2 and also to FIG. 4, there is illustrated a cover which fits over the solar cells and which forms a part of the solar cell assembly. The cover 50 is optically clear and is preferably constructed of a polycarbonate plastic material which is impact resistant. The polycarbonate material thus protects the solar cells from incidental contact and also from dust. As is shown, the cover 50, at its outer rim 52, includes a plurality of lugs as shown at 54, 56 and 58. Each of the lugs includes spaced apart protrusions as shown at 60 and 62 with respect to the lug 56. Again, the lugs are angularly disposed about the cover 50 and preferably at 90° spacing to match the spacing of the snap lock retainers 30 formed on the bezel 22. The protrusions 60 and 62, when the cap 50 is positioned in place within the bezel 22, are spaced one on each side of a snap lock tongue formed on the solar cell assembly such, for example, as shown at 68 and to be described more fully below. As is more clearly shown in FIG. 4, the protrusions 64 and 66 extend below the lower rim 70 of the cover 50. Further protrusions are shown at 72 and 74 and are those associated with the lugs 54 and 58 respectively. The general curvature of the cap 50 is also further and better illustrated in FIG. 4. As is also shown in FIG. 4, the cover 50 includes a step 76 in the periphery thereof. The step 76 fits within the opening 32 and conforms to the upper edge 46 of the bezel 22. The step 76 terminates in a ledge 78 which snugly mates against the upper portion 80 of the inner surface 24 of the bezel 22.

The solar cell assembly 82, along with the cover 50, are assembled together and snapped into the bezel 22. Additional locking tongues 84 and 86 displaced 90° from the tongue 68 are illustrated and an additional locking tongue, not shown, is disposed 180° from the tongue 68. As with the other protrusions, latching ribs and the like, the angular displacement of the locking tongues may be any desired. In any event, the displacement is such that the locking tongues on the solar cell assembly 82 mate with the snap lock retainers 30, 42 and 44 on the inner surface 24 of the bezel 22. For assembly, the cover 50 is placed so that the protrusions 60 and 62 fall outside the tongue 68, thus securely and snugly fitting the cover over the solar cell assembly 82. The combination is then inserted into the bezel 22 and the locking tongues 68, 84 and 86 are snapped into place in the space provided between the upper edge 46 and the snap lock retainers 30, 42 and 44 at the upper part 48 of the bezel 22. The ability to snap the combination of the cover 50 and the solar cell assembly into place is provided by the flexibility of the molded plastic forming the bezel 22.

A component tray assembly 90 is provided to receive a battery 92 and electrical circuit assembly 94 and light bulb (not shown) in a central aperture 96. The tray 90 is interconnected by electrical wires 98 and 100 to the solar cell assembly 82 so that electrical power may be provided from the solar cells to the battery 92 to maintain the same in a charged condition. The battery also, through the provision of the circuit assembly provides electrical power to the light when the solar cells are not generating electrical energy. The component tray assembly 90 includes notches 102, 104, 106 and 108 which are used to locate the component tray assembly 90 within the space between the spaced apart latching ribs 26, 28, 34, 36, 38 and 40. The tray may then be rotated and secured in position at the bottom part 88 of the bezel 22. The lower surface of the component tray assembly 90 then closes the bottom of the bezel 22 to provide a completed assembly.

The lens 14 includes outwardly extending latching fingers 110, 112, 114 and 116. Such fingers are inserted within openings as shown at 118 and 120 and the lens is rotated appropriately to latch the same in place so as to extend downwardly from the component tray assembly 90. The disks 20 are assembled upon the outer surface of the lens 14 by slipping the openings as illustrated at 152 and 154 over outwardly extending sectors 122 and 124 and then rotating the disks so that they occupy the space between the sectors 122 and 124 and the stops 126 and 128 associated with the sector 122 and the stops 130 and 132 associated with the sector 124.

The stake 16 is assembled by inserting the body portions 134 and 136 over the central coupling 138 and securing the same by the use of screws inserted into the openings as illustrated at 140 and 142. Similarly, the tip 144 may be inserted into the bottom of the body portion 136 and secured in place by a screw positioned within the opening 146. The entire assembly is then inserted over the protrusion 148 provided at the bottom of the lens 14 and held in place by a screw inserted through the opening 150 in the body portion 134 of the stake 16. Obviously, if such is desired to cause the lamp 10 to extend a lesser distance from the surface, the coupling 138 and the body portion 136 may be discarded.

Figure 5:
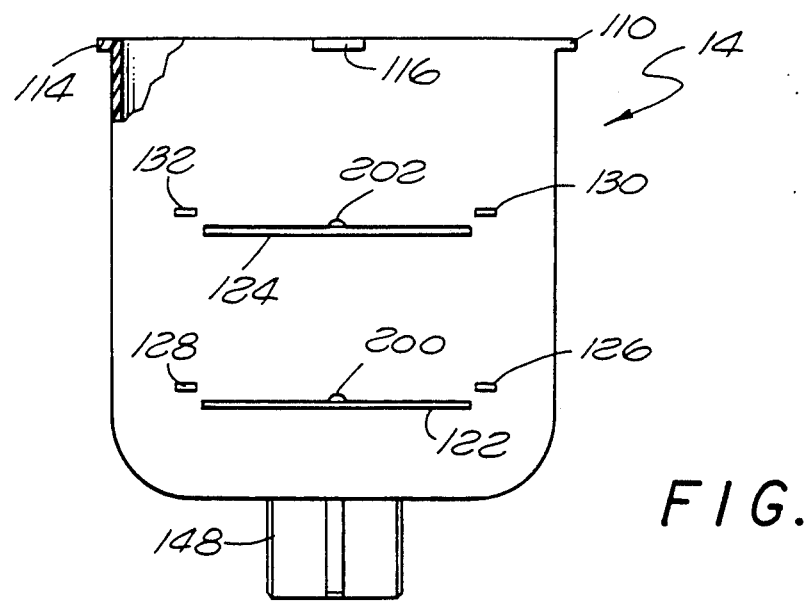
FIG. 5 is a plan view of the lens for the lamp.
Figure 6:
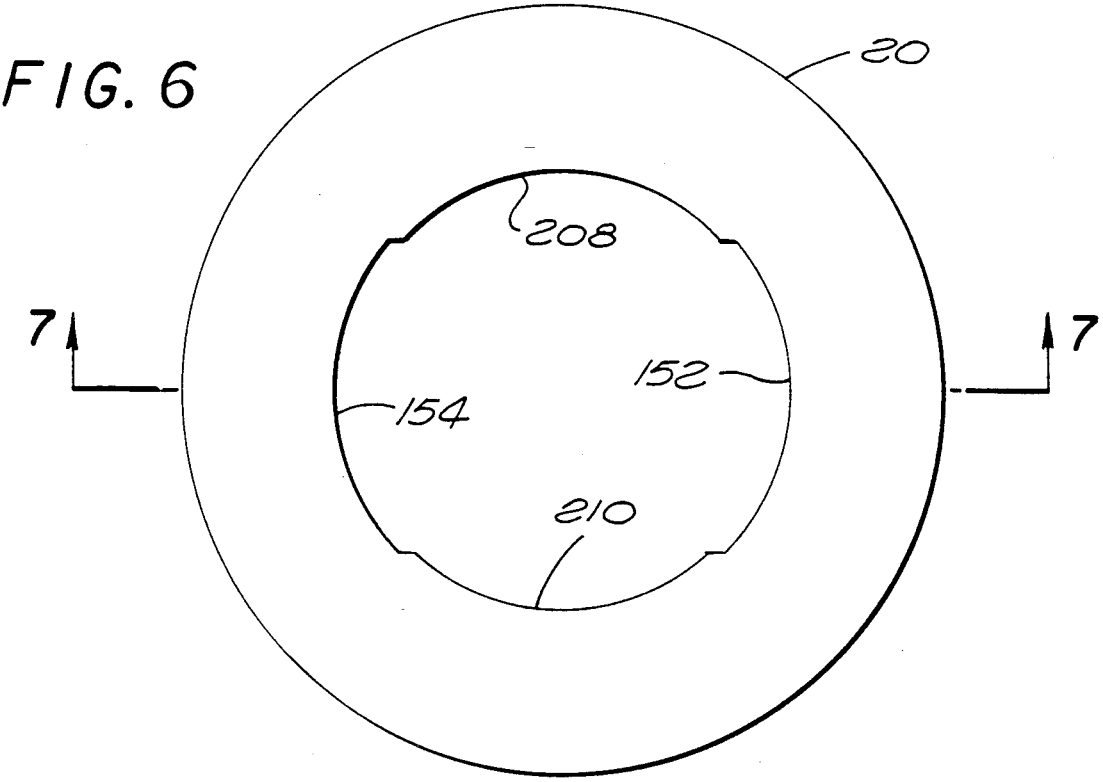
FIG. 6 is a top plan view of a decorative disk.
Figure 7:
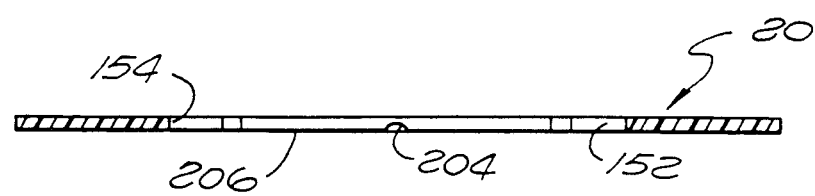
FIG. 7 is a cross-sectional view of the disk illustrated in FIG. 6 taken about the lines 7—7 thereof.

By reference now more particularly to FIGS. 5 through 7, there is illustrated in further detail the lens 14 and the disks 20 and the relationship therebetween which enable easy assembly thereof. As is shown particularly in FIG. 5, the sectors 122 and 124 contain protrusions 200 and 202 extending upwardly therefrom. The disk 20 includes a recess or detent 204 formed in the lower surface 206 thereof. When the disks 20 are to be assembled upon the lens 14, the disks are oriented so that the openings 152 and 154 are aligned with a sector 122. The openings 152 and 154 are sufficiently large enough so that the disk will easily pass not only the sector 122 but also the stops 126 and 128. The disk is then positioned such that it is disposed in the space provided between the sector 124 and stops 130-132. It will be obvious to those skilled in the art that there are counterparts to the sectors and stops on the opposite side of the lens 14 as viewed in FIGS. 2 and 5. Once the disk 20 is positioned in place as above described, it is rotated approximately 90° so that the innermost portions 208 and 210 of the disk 20 are disposed in the space provided between the sector 124 and the stops 130-132. Rotation is continued until the detent 204 receives the protrusion 202. At this point, the disk is locked in position and cannot easily be displaced without applying substantial force thereto. By utilization of the protrusion 202 and detent 204, the disk is securely fastened on the lens 14 without the necessity of application of undue stress thereto. The additional disk 20 is positioned upon the lens 14 and secured in place in a similar manner, as that just described, but with respect to the sector 122 and the stops 126-128 and their counterparts on the opposite side of the lens 14.

Figure 8:
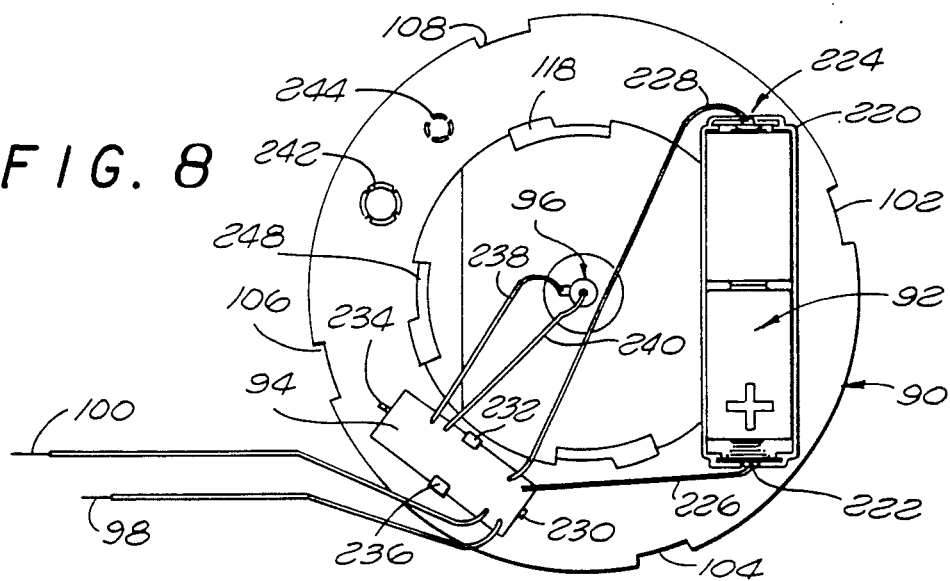
FIG. 8 is a top plan view of the component assembly tray with component's position therein.
Figure 9:
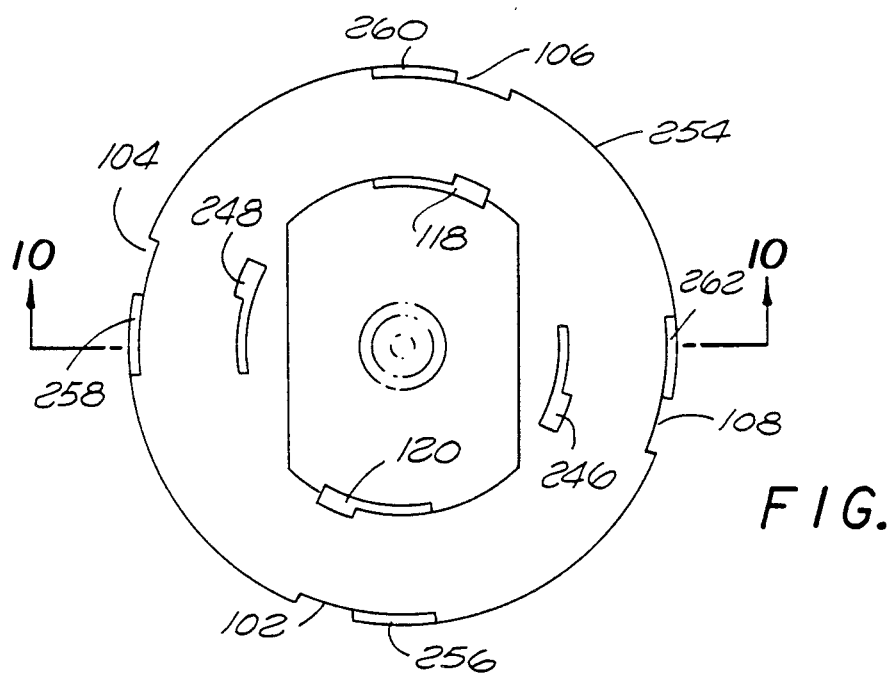
FIG. 9 is a bottom plan view of the tray of FIG. 8.
Figure 10:
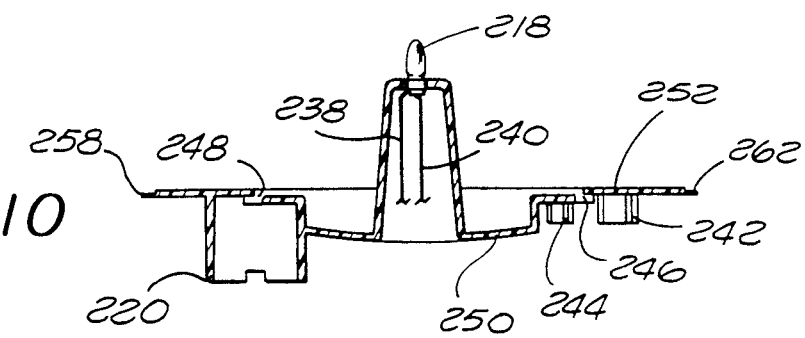
FIG. 10 is a cross-sectional view of the tray showing FIG. 9 taken about the lines 10—10 thereof.

Referring now more particularly to FIGS. 8 through 10, the component tray assembly 90, with the various components contained thereon, is illustrated in greater detail. As is therein shown, the battery 92 is supported within a battery container compartment 220. Attached to the compartment are appropriate contacts 222 and 224 to receive electrical wires 226 and 228, respectively, to be connected to the circuit board 94 which contains the appropriate electrical circuit to control the application of power to the battery for charging, or from the battery to the lamp 228 to illuminate the same. The circuit board 94 is retained upon the component tray 90 by clips 230, 232, 234 and 236 which are molded as part of the tray 90. The circuit board 94 may simply be pressed into place and held by the clips 230 through 236. Appropriate electrical leads 238 and 240 extend from circuit board 94 to the electric lamp bulb 218 which is appropriately supported within the opening 96.

Also extending from the upper surface of the component tray assembly 90 are spare bulb holders 242 and 244.

In addition to the openings 118 and 120, there are also provided similar openings 246 and 248. The openings 118, 120, 246 and 248 are designed to receive the latching fingers 110 through 116 formed on the upper edge of the lens 14. To assemble the lens 14 into the component tray 90, the fingers 110 through 116 are inserted into the large portion of the openings 118, 120, 246 and 248 and then rotated clockwise as viewed in FIG. 8 so that the lugs are secured in place. As is more clearly illustrated in FIG. 10, the central portion 250 is positioned more toward the right than is the outer section 252 of the tray. There is thus a spacing within the openings to permit the fingers to be received through the openings and, after rotation, to be held in place on the component tray 90.

As is more clearly shown in FIGS. 9 and 10, the outer periphery 254 of the outer portion 252 of the tray has the notches 102 through 108 defined therein. Extending from the notches in a counter-clockwise direction, as viewed in FIG. 9, are reduced thickness areas 256, 258, 260 and 262. The reduced thickness areas 256 through 262 may be viewed as blades defined by the outer periphery 254 which are utilized to secure the component tray to the bezel 22. To accomplish such securement, the notches 102 through 108 are aligned in such a way that the component tray slips past the latching ribs 28, 36 and 40 and the tray rests against the latching ribs 26, 38 and 34. The component tray is then rotated in a clockwise direction to cause the blades 256 through 262 to be secured in the space between the latching ribs 26 and 28, 34 and 36, and 38 and 40, as well as the additional pair of latching ribs disposed 180° from the latching ribs 26 and 28. In this manner, the component tray is securely held in place at the bottom of the bezel 22 and, as above indicated, closes the bottom surface of the bezel.

As can be clearly seen, the self-contained solar powered lamp of the present invention may be readily and easily assembled by merely placing the various components in their respective positions, snapping the solar cell assembly and the cover in place, rotating the component tray assembly into a locking position, placing the disks upon the lens and then securing the lens by placing the latching fingers within the required openings and rotating the same in a clockwise direction. Thus such clockwise rotation of each of the components will lock the various components in position, thus completing the assembly of the solar powered light, after which the stake may be attached and the lamp disposed in the desired position.

What is claimed is:

1. A self-contained solar powered lamp comprising: bezel means having an upper part and a lower part; a solar cell array in said bezel means at the upper part of said bezel means; a component tray rotationally secured to said bezel means at the lower part of said bezel means; lightbulb contact means disposed in the component tray to hold a lightbulb downward from the component tray; and lens means rotationally secured to said component tray and extending downwardly from said component tray.

2. A self-contained solar powered lamp as defined in claim 1 wherein said bezel includes an inner surface having a plurality of spaced apart pairs of latching ribs extending therefrom, said component tray having an outer periphery defining means for engaging said spaced apart latching ribs for rotationally securing said component tray to said bezel means.

3. A self-contained solar powered lamp as defined in claim 2 wherein one of said latching ribs of each pair of latching ribs has a first linear dimension and the other of said latching ribs of each pair of latching ribs has a second linear dimension, said first linear dimension being smaller than said second linear dimension and said means on said component tray for engaging said ribs includes a notch having a dimension substantially equal to said first linear dimension, said bezel having a lower terminal edge, each of said latching ribs having said first linear dimension being disposed immediately adjacent said lower terminal edge.

4. A self-contained solar powered lamp as defined in claim 3 wherein said means for engaging on said component tray first includes a blade-like means disposed adjacent each said notch, said blade-like means being received in the space between said latching ribs for securing said component tray to said bezel.

5. A self-contained solar powered lamp as defined in claim 4 wherein said component tray further includes a container for receiving a battery, said container being formed as an integral part of said component tray.

6. A self-contained solar powered lamp as defined in claim 5 wherein said component tray further includes means formed integrally therewith for receiving a circuit board and retaining the same.

7. A self-contained solar powered lamp as defined in claim 4 which further includes means for receiving and retaining in position a light bulb.

8. A self-contained solar powered lamp as defined in claim 4 which further includes means for receiving and retaining spare light bulbs as an integral part thereof.

9. A self-contained solar powered lamp as defined in claim 4 which further defines a plurality of openings spaced inwardly from said outer periphery thereof, said lens means having a plurality of latching fingers extending therefrom for engaging said openings to rotationally secure said lens means to said component tray.

10. A self-contained solar powered lamp as defined in claim 9 wherein each of said openings includes a first width and a second adjoining width said first width being larger than said second width, said latching fingers being of a size substantially equal to said first width so that upon said rotation of said lens said fingers are secured to said component tray by said second smaller width.

11. A self-contained solar powered lamp as defined in claim 1 wherein said lens means includes an outer surface having a plurality of spaced apart securing sectors and stops disposed thereon and which further includes a plurality of toroidally shaped disks each having an inner surface, the inner surface of each of said disks further defining a recess, each of said recesses having a dimension sufficient when aligned with said sectors and stops to pass thereover thus allowing said disk to be moved along the outer surface of said lens.

12. A self-contained solar powered lamp as defined in claim 11 wherein each of said sectors includes a protrusion extending therefrom and each of said disks includes a detent formed therein, said detent engaging said protrusion when said disk is rotated in the space between said sectors and adjacent stops to thereby secure said disk in place upon the exterior of said lens.

13. A self-contained solar powered lamp comprising:
bezel means having an upper part and a lower part;
a solar cell array in said bezel means at the upper part of said bezel means;
a component tray rotationally secured to said bezel means at the lower part of said bezel means, said component tray having a battery contact means, lightbulb contact means and a circuit assembly for providing electrical power from the solar cell array to the battery contact means and for providing electrical power from the battery contact means to the lightbulb contact means; and
lens means rotationally secured to said component tray and extending downwardly from said component tray.

* * * * *